United States Patent
Bhatt et al.

(10) Patent No.: US 10,223,714 B2
(45) Date of Patent: *Mar. 5, 2019

(54) DETERMINATION OF TARGETED FOOD RECOMMENDATION

(71) Applicant: INTERNATIONAL BUSINESS MACHINES CORPORATION, Armonk, NY (US)

(72) Inventors: Dhruv A. Bhatt, Indian Trail, NC (US); Bhargav Cheenepalli, Charlotte, NC (US); Kristin E. McNeil, Charlotte, NC (US); Nitaben A. Patel, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/667,711

(22) Filed: Aug. 3, 2017

(65) Prior Publication Data

US 2017/0330241 A1 Nov. 16, 2017

Related U.S. Application Data (63) Continuation of application No. 15/063,732, filed on Mar. 8, 2016.

(51) Int. Cl.
*G06Q 30/02* (2012.01)
*G06Q 50/12* (2012.01)
(Continued)

(52) U.S. Cl.
CPC ... *G06Q 30/0271* (2013.01); *G06F 17/30867* (2013.01); *G06Q 30/0631* (2013.01);
(Continued)

(58) Field of Classification Search
None
See application file for complete search history.

(56) References Cited

U.S. PATENT DOCUMENTS

| | | |
|---|---|---|
| 7,876,214 B1 | 1/2011 | Brady, Jr. |
| 8,494,896 B1 | 7/2013 | Lagana |
| | (Continued) | |

FOREIGN PATENT DOCUMENTS

| | | |
|---|---|---|
| GB | 2443847 A | 5/2008 |

OTHER PUBLICATIONS

Hsiao et al., "Preference-Driven Personalized Recommendation by k-Comparative Annotation and Reasoning," 2012 IEEE International Conference on Service Operations and Logistics, and Informatics (SOLI), Jul. 8-10, 2012, Suzhou, Copyright 2012 IEEE, pp. 7-12.

(Continued)

*Primary Examiner* — Florian M Zeender
*Assistant Examiner* — Denisse Y Ortiz Roman
(74) *Attorney, Agent, or Firm* — L. Jeffrey Kelly (57) ABSTRACT

A computer-implemented method, computer program product, and system for generating a targeted menu item recommendation are provided. The targeted menu item recommendation includes receiving a menu item recommendation request, generating search criteria for the menu item recommendation request, retrieving menu information regarding the search criteria, assigning weighted values to the retrieved information based on the text of the menu item information, preferences of the user, and social media association values, and generating the targeted menu item recommendation.

1 Claim, 6 Drawing Sheets

(51) Int. Cl.
*G06Q 30/06* (2012.01)
*G06F 17/30* (2006.01)
*G06Q 50/00* (2012.01)
*G06F 9/00* (2006.01)
*G06Q 30/00* (2012.01)

(52) U.S. Cl.
CPC ............ *G06Q 50/01* (2013.01); *G06Q 50/12* (2013.01); *G06F 9/00* (2013.01); *G06Q 30/00* (2013.01)

(56) References Cited

U.S. PATENT DOCUMENTS

| | | |
|---|---|---|
| 8,903,708 B2 | 12/2014 | Derks et al. |
| 9,372,589 B2* | 6/2016 | Rahle ................ G06F 3/048 |
| 2008/0147611 A1 | 6/2008 | Bennett |
| 2011/0208617 A1 | 8/2011 | Weiland |
| 2012/0239683 A1 | 9/2012 | Starkman |
| 2014/0025670 A1 | 1/2014 | Daran et al. |
| 2014/0259189 A1 | 9/2014 | Ramachandran |
| 2015/0287120 A1 | 10/2015 | Davidson |
| 2016/0232624 A1* | 8/2016 | Goldberg ............... G06Q 30/02 |

OTHER PUBLICATIONS

Mell et al., "The NIST Definition of Cloud Computing", National Institute of Standards and Technology, Special Publication 800-145, Sep. 2011, pp. 1-7.

Pending U.S. Appl. No. 15/063,732, filed Mar. 8, 2016, entitled: "Determination of Targeted Food Recommendation", 29 pages.

IBM: List of IBM Patents or Patent Applications Treated As Related (Appendix P), Aug. 16, 2017, 2 pages.

* cited by examiner

DETERMINATION OF TARGETED FOOD RECOMMENDATION

BACKGROUND

The present invention relates generally to the fields of software-based text analytics and social media websites, and more particularly to software-based text analytic processing of food reviews and menu items.

Software-based natural language processing type text analytics (SBTA) is known. Under conventional SBTA techniques, first, data corresponding to a piece of text (herein sometimes called the "subject text") is provided. This piece of text will generally be written in a "natural language." As used herein, the term "natural language" means as follows: any language which arises in an unpremeditated fashion as the result of the innate facility for language possessed by the human intellect. Examples of natural languages include regional and national spoken and written human languages such as English and Latin. The subject text, to be subject to SBTA, is written, or otherwise generated, by an entity that is herein sometimes called the "author." The author is generally, but not necessarily, a human.

SBTA is the derivation of high-quality information from the subject natural language text using software based dictionaries and rules which are applied to the subject natural language text. SBTA may include other features and/or characteristics, such as: (i) high-quality information derived from natural language subject text through the devising of patterns and trends through means such as statistical pattern learning; (ii) text categorization; (iii) text clustering; (iv) concept/entity extraction; (v) production of granular taxonomies; (vi) sentiment analysis; (vii) document summarization; (viii) entity relation modeling (that is, learning relations between named entities); (ix) information retrieval; (x) lexical analysis to study word frequency distributions; (xi) pattern recognition; (xii) tagging/annotation; (xiii) information extraction; (xiv) data mining techniques (including link and association analysis); (xv) visualization; (xvi) predictive analytics; (xvii) use of parsing rules; and/or (xviii) use of character rules.

UIMA (Unstructured Information Management Architecture) is an industry standard for content analytics, which can be used to help make SBTA software for performing software-based natural language type text analytics. UIMA is a component software architecture for the development, discovery, composition and/or deployment of multi-modal analytics for the analysis of unstructured information and its integration with search technologies.

Social media websites (SMWs), and the software that creates, manages and controls SMWs, is also known. An SMW is an interactive web platform by which individuals and communities share, co-create, discuss, modify user-generated content, and/or mediate human communication.

In many SMWs, a user will have one or more groups of other selected users to whom the user is considered to be socially related. These groups of socially-related users are typically called "friends," "connections," "circles," or the like. The establishment of this social relationship (for example, friend, or connection) may require both parties to agree to the designation of the social relationship, but this is not always necessarily required. The establishment of the social relationship may require (or at least encourage) socially related parties to have a relationship outside of the context of the SMW, but this is also not always necessarily required. Herein, social relationships like friends, connections, circles and the like will be generically referred to as a "set of SMW-related-users" and/or "SMW-related-users."

SUMMARY

Embodiments of the present invention disclose a computer-implemented method, computer program product, and system for generating a targeted menu item recommendation. A menu item recommendation request is received from a user. Search criteria is determined from the menu item recommendation request. Menu item information and reviews satisfying the search criteria are retrieved. A value is given to each menu item and review based on user preferences and SMW association values. The targeted menu item recommendation is generated based on the values assigned to the menu items and reviews and sent to the user.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In many societies, people are highly mobile and have extensive access to information regarding particular destinations. Whether a person is traveling to a new region of the world or a different neighborhood within walking distance of their home, information regarding their destination is readily available. Many applications are available to consumers regarding restaurant menu items and reviews. However, oftentimes these applications provide too many suggestions, many of which may not be geared towards a specific user's preferences. Furthermore, reviews are typically made by people not familiar to the user, leaving the user with little information regarding the similarity in preferences between the user and the reviewer.

The present invention provides a system, a method, and/or a computer program product providing a user with targeted menu item recommendations based on user preferences, public reviews, and weighted friend reviews. One way to provide a user with targeted menu item recommendations uses text analytics, user preferences, and social media networks. One embodiment by which to provide a user with targeted menu item recommendations is described below referring to the accompanying drawings FIGS. 1-6. For the purposes of the described embodiment, the user will request recommendations for a specific menu item, however, it should be understood that the user request can pertain to other food based categories (e.g., restaurants and dish types).

Figure 1:
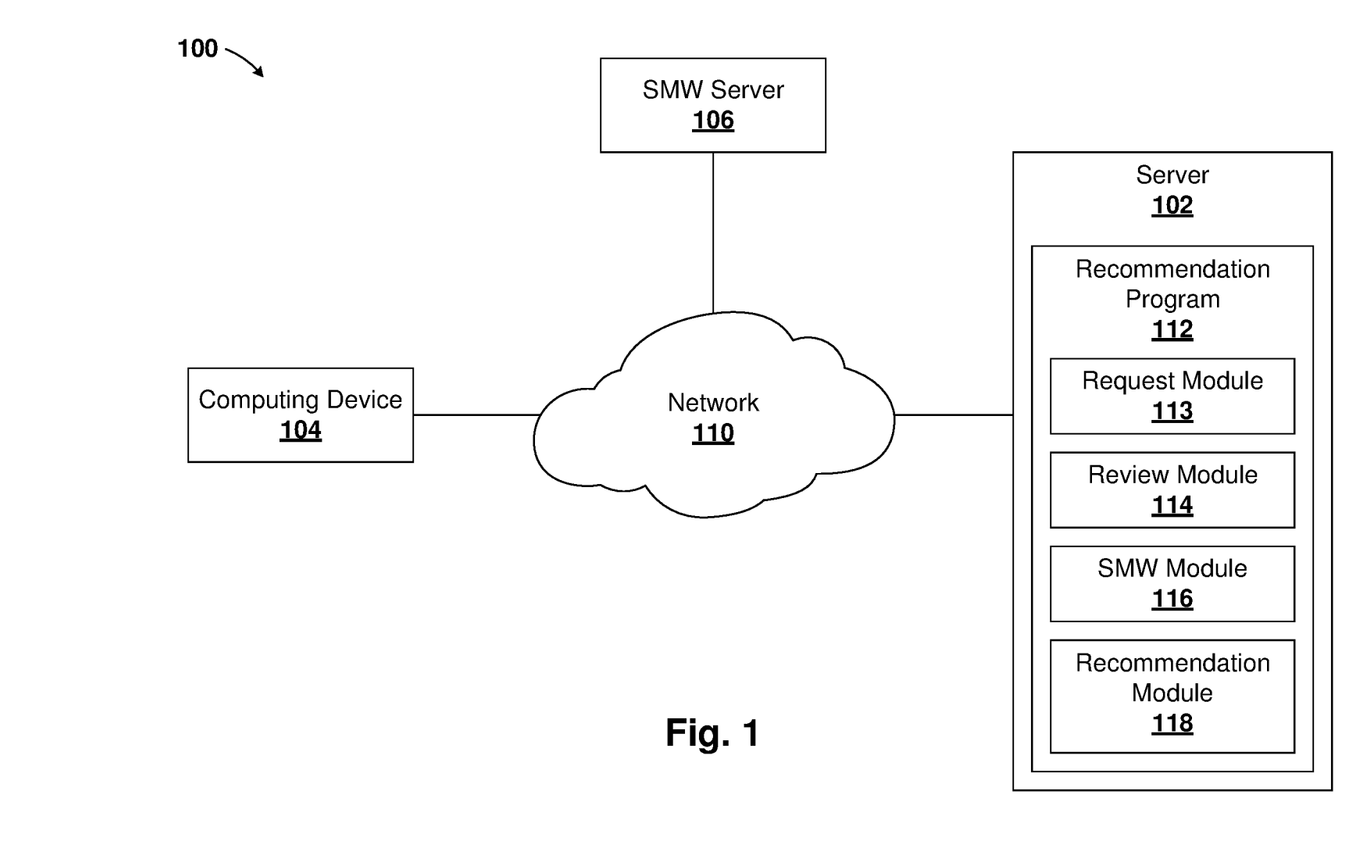
FIG. 1 is a functional block diagram illustrating a distributed data processing environment, according to an exemplary embodiment.

FIG. 1 is a functional block diagram of targeted menu item recommendation system 100, according to an embodiment. The targeted menu item recommendation system 100 includes server computer 102, SMW server 106 and computing device 104 connected via network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server 102, SMW server 106 and computing device 104, in accordance with one or more embodiments of the invention.

Computing device 104 may be laptop computers, tablet computers, netbook computers, personal computers (PC), desktop computers, personal digital assistants (PDA), smartphones, SMS capable phones, or any programmable electronic device capable of communicating with server computer 102 and SMW Server 106 via network 110, in accordance with one or more embodiments of the invention.

In an embodiment, computing device 104 is a device used for communication with a SMW (e.g., SMW server 106), such as, for example, Twitter® or Facebook®. Users of the SMW may have an SMW association where each user may have mutually requested to have "associate" or "friend" status, as defined by the software of the SMW. This status is an example of being "SMW related" as that term is used in this document. For present purposes, the point is not so much about exhaustively defining all the ways that users of an SMW may become SMW related, but rather the concept that some users of an SMW will be SMW related to each other, and others will not be SMW related. In an embodiment, the user of computing device 104 will be referred to as a first user and other users associated to the first user through the SMW will be referred to as associates of the first user.

Server computer 102 may be a laptop computer, tablet computer, netbook computer, personal computer (PC), a desktop computer, a personal digital assistant (PDA), a smart phone, an SMS capable phone, or any programmable electronic device capable of communicating with computing device 104 and SMW server 106 via network 110, in accordance with one or more embodiments of the invention. Server computer 102 includes recommendation program 112 having request module 113, review module 114, SMW module 116, and recommendation module 118. Recommendation program 112 generates a targeted menu item recommendation in response to a user recommendation request.

In an embodiment, request module 113 is a collection of machine readable instructions and data that is used to receive and analyze information contained in the user recommendation request. Review module 114 is a collection of machine readable instructions and data that is used to retrieve, manage, and control information gathered from public sources or application based review platforms regarding the user recommendation request. SMW module 114 is a collection of machine readable instructions and data that is used to retrieve, manage, and control information from SMWs (e.g., SMW server 106) regarding the user's request and to determine SMW associations. Recommendation module 118 is a collection of machine readable instructions and data that is used to retrieve, manage, and control information collected by review module 114 and SMW module 116 to generate a targeted menu item recommendation.

Figure 2:
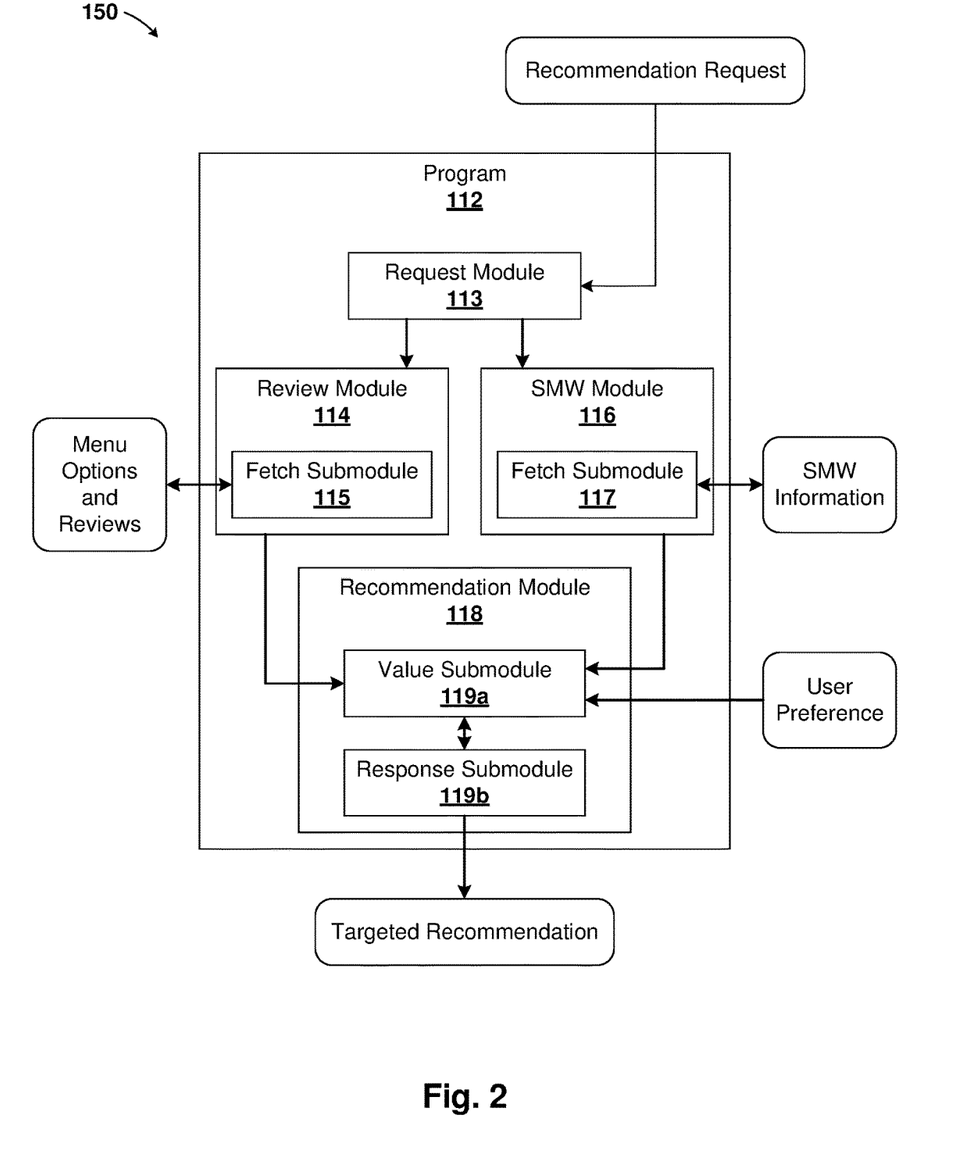
FIG. 2 is a functional block diagram further illustrating the parts of a program, according to an exemplary embodiment.

A detailed block diagram of recommendation program 112 is provided in FIG. 2. An exemplary embodiment of steps performed by recommendation program 112 is provided in FIG. 3. Recommendation program 112 may run on server 102 (as illustrated), computing device 104, and/or on any device(s) connected through network 110. Server 102 and computing device 104 may include internal and external hardware components, as described in reference to FIG. 4.

FIG. 2 is a functional block diagram of recommendation program 112, according to an embodiment. More specifically, the modules and process flow of recommendation program 112 are provided in further detail.

As illustrated, recommendation program 112 includes request module 113, review module 114, which further includes fetch module 115, SMW module 116, which further includes fetch module 117, and recommendation module 118, which further includes value submodule 119a and response submodule 119b, in accordance with one or more embodiments of the invention. Recommendation program 112 generates a targeted menu item recommendation in response to a user request, based on user preferences, online restaurant menu item reviews, and recommendations and opinions of associates of the user on SMWs.

In an embodiment, request module 113 receives a menu item recommendation request from computing device 104 originating from the first user. Request module 113 performs SBTA to determine the relevant criteria for collecting information regarding the menu item recommendation request. For example, the first user might request a menu item recommendation for a seafood dish containing fewer than 700 calories at a restaurant within a specific zip code. In this example, request module 113 may determine that the first user is requesting a targeted menu item recommendation that includes three categories of interest (i.e., type of dish, calorie count, and location) which may be assigned tags or annotators to define search classes. Request module 113 can send the search criteria to review module 114 and SMW module 116 for the collection of relevant information regarding the determined search criteria.

Fetch submodule 115 retrieves information relating to the search criteria from available sources such as online restaurant menus and review guides. The software and data that makes up restaurant websites and food review applications would be examples of informational sources for fetch submodule 115. Fetch submodule 117 retrieves information relating to the search criteria from SMW's, such as Twitter® or Facebook®. The software and data that makes up Facebook® would be an example of an informational source for fetch submodule 117.

In an embodiment, fetch submodules 115 and 117 retrieve information, based on the search criteria, and may assign an initial value to each piece of information relating to the degree of which the information can be interpreted as a positive recommendation of a menu item. For example, if fetch submodule 115 finds three reviews meeting the search criteria but each have different rating scales (e.g., 4 out of 5 stars, two thumbs up, or an overall positive review determined by text analysis), each review can be given a normalized initial value within a defined range. If the defined range is 0-10, for example, 4 stars may be given a normalized initial value of 8, two thumbs up could be given a normalized initial value of 10, and an overall positive review may be given a normalized initial value depending on the context of the information as determined by the text analysis (e.g., "the dish was above average" may be given a 7 or 8 out of 10). Review module 114 and SMW module 116 can send the collected information from fetch submodules 115 and 117 to recommendation module 118 for further analysis. Alternatively, review module 114 and SMW module 116 may not assign any value to the collected information, such that values are applied to the collected information during analysis in recommendation module 118.

In an embodiment, value submodule 119a receives the collected information from review module 114 and SMW module 116 and applies a weighting value to each piece of information based on, for example, user preferences (e.g., vegan, likes cheese, dislikes spicy food) and association values (e.g., information linked to SMW associates). The weighing value can be a multiplier, an additive value, or a value using any other value adjustment technique.

Regarding user preferences, value submodule 119a can collect user preferences from the SMW (e.g., a post or profile of the first user), user defined preferences (i.e., preferences entered directly into recommendation program 112), or any other available data collection method regarding the user's preferences. For example, the first user may enter the fact that he is lactose intolerant directly into recommendation program 112 via a user interface on computing device 104 or server 102. Additionally, recommendation program 112 may retrieve information from the SMW that includes a post by the first user expressing his dislike for spicy food. Alternatively, the user preferences may be applied during the initial valuation of review module 114 and SMW module 116.

Regarding association values, value submodule 119a can determine an association value for information collected by fetch submodules 115 and 117 linked to an associate user. For example, a second user may be an associate of the first user. Generally, if a user is an associate of the first user, the first user can make a better determination of the relevance of the review over a review received from a user that is unknown to the first user. Therefore, a higher weighting value may be given to the associate's review. Value submodule 119a may review information regarding the second user to determine if the second user has similar preferences as the first user using SBTA (even though the first and second users are associates, the first user may not know every preference of the second user). For example, a lower weighted value may be given to a menu item review provided by the second user, where the second user gives a menu item a perfect rating and states that the menu item was "very spicy." Value submodule 119a may apply the association values to the normalized initial values applied by review module 114 and SMW module 116. Alternatively, the association values may be applied during the initial valuation of review module 114 and SMW module 116.

The weighting values can be based on any valuation system such as, for example, a yes/no valuation system or a scaled valuation system. For example, value submodule 119a may use a yes/no valuation system for foods containing lactose because the first user is lactose intolerant. Such that, a menu item containing lactose may be given a value of zero (i.e., a "no" determination) essentially removing the menu item from the targeted recommendation. Alternatively, value submodule 119a may use a scaled valuation system for foods recommended by associates with similar preferences versus associates with different preferences. For example, a third user may share a preference of menu items that are not spicy (oppose to the second user who likes spicy food), such that a higher scaled value will be given to a positive review given by the third user and a lower scaled value will be given to a positive review given by the second user (regarding the collection category of spicy foods).

Response submodule 119b can receive the collected information (with the initial value and/or weighted value) from value submodule 119a to generate the targeted recommendation. For example, value submodule 119a will send the collected data with the applied weighted values to response submodule 119b. Response submodule 119b can organize the collected information in a fashion set by the user or any other method. For example, the collected data may be organized in descending order based on the weighted values. Once the collected information is organized by response submodule 119b, the organized targeted recommendation may be sent to the user via computing device 104.

Figure 3:
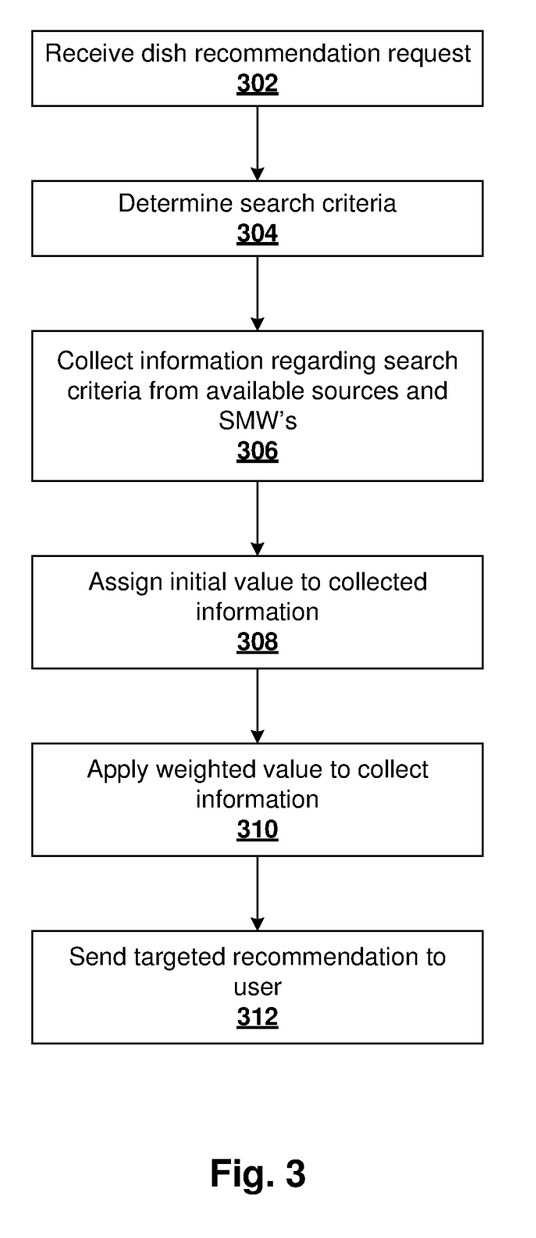
FIG. 3 is a flowchart depicting operational steps of the program, according to an exemplary embodiment.

FIG. 3 is a flowchart depicting operational steps of recommendation program 112, according to an exemplary embodiment.

Request module 113 receives a menu item recommendation request from a user via a computing device (Step 302). Request module 113 can perform text analytics on the recommendation request to determine the search criteria to be performed (Step 304). For example, request module 113 may determine that the first user is requesting a menu item recommendation for a seafood dish containing fewer than 700 calories at a restaurant within a specific zip code. The search criteria can include three search categories (e.g., type of food, calorie count, and location). Fetch submodules 115 and 117 can collect information relevant to the search criteria from available online sources and SMW's (Step 306). For example, fetch submodules 115 and 117 can collect information from publically available restaurant menus, review guides, and SMW's using text analytics. Fetch submodules 115 and 117 can assign an initial value to each piece of information (Step 308). Value submodule 119a can apply a weighting value to the collected data based on user preferences and association value (Step 310). Response submodule 119b can then send an organized targeted menu item recommendation to the user via computing device 104 (Step 312).

Figure 4:
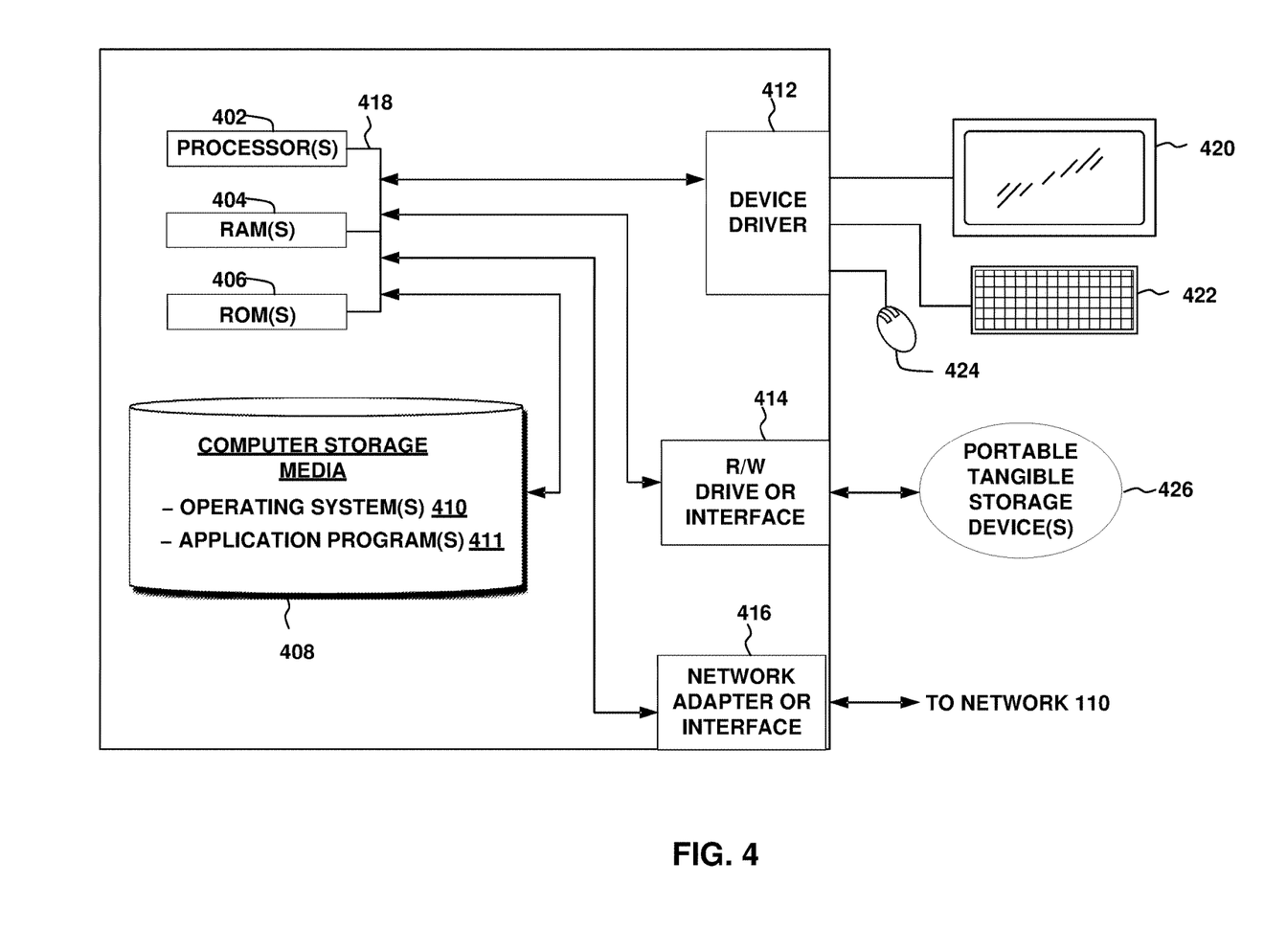
FIG. 4 is a block diagram of components of a server computer executing the program, according to an exemplary embodiment.

FIG. 4 is a block diagram of components of the server computer 102, in accordance with an illustrative embodiment of the present invention. It should be noted, computing device 104 may also include the same components described herein.

Server computer 102 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, recommendation program 112 described in reference to FIG. 1, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server computer 102 may also include a R/W drive or interface 414 to read from and write to one or more portable computer readable storage media 426. Application programs 411 on server computer 102 may be stored on one or more of the portable computer readable storage media 426, read via the respective R/W drive or interface 414 and loaded into the respective computer readable storage media 408.

Server computer 102 may also include a network adapter or interface 416, such as a TCP/IP adapter card or wireless communication adapter (such as a 4G wireless communication adapter using OFDMA technology). Application programs 411 on server computer 102 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server computer 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
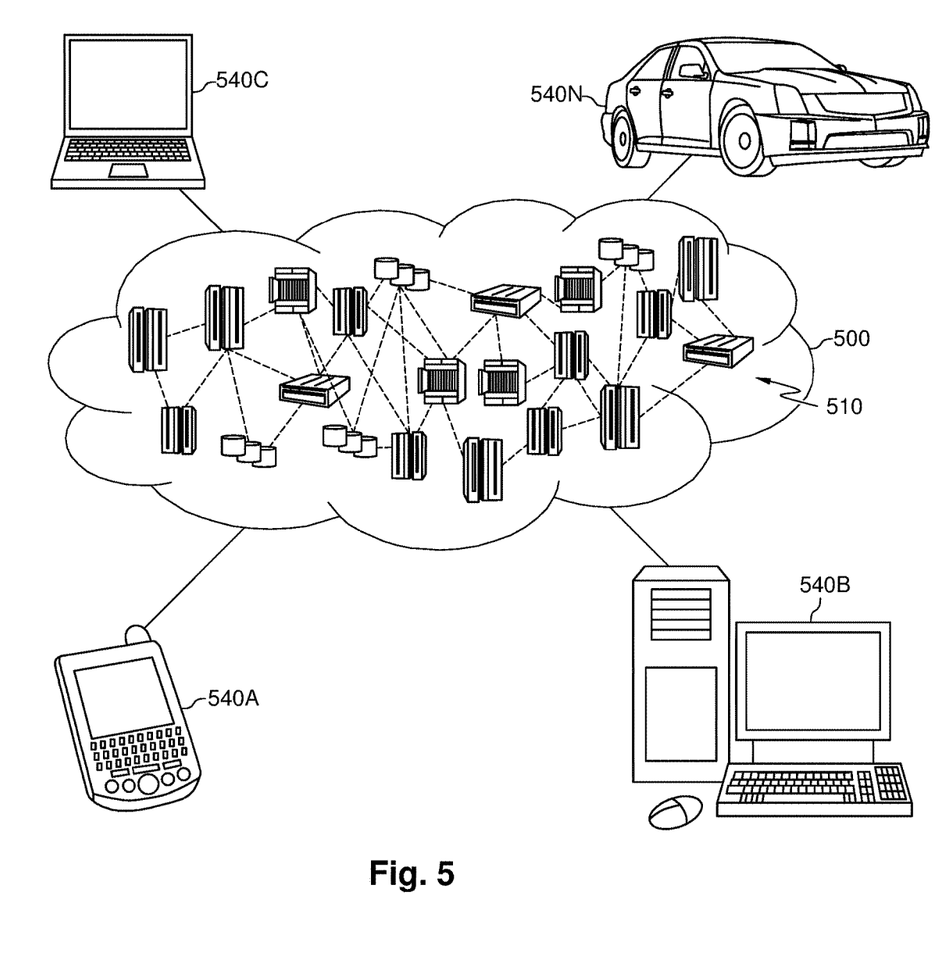
FIG. 5 depicts a cloud computing environment, according to an exemplary embodiment.

Referring now to FIG. 5, an illustration of a cloud computing environment 500 is depicted, according to an exemplary embodiment. The cloud computing environment 500 can include one or more cloud computing nodes 510 with which local computing devices used by cloud consumers, such as, for example, personal digital assistant (PDA) or cellular telephone 540A, desktop computer 540B, and/or laptop computer 540C may communicate. The nodes may be grouped (not shown) physically or virtually, in one or more networks, such as Private, Community, Public, or Hybrid clouds as described hereinabove, or a combination thereof. This allows the cloud computing environment to offer infrastructure, platforms and/or software as services for which a cloud consumer does not need to maintain resources on a local computing device. It is understood that the types of computing devices 540A-C are intended to be illustrative only and that computing nodes and the cloud computing environment can communicate with any type of computerized device over any type of network and/or network addressable connection (e.g., using a web browser).

Figure 6:
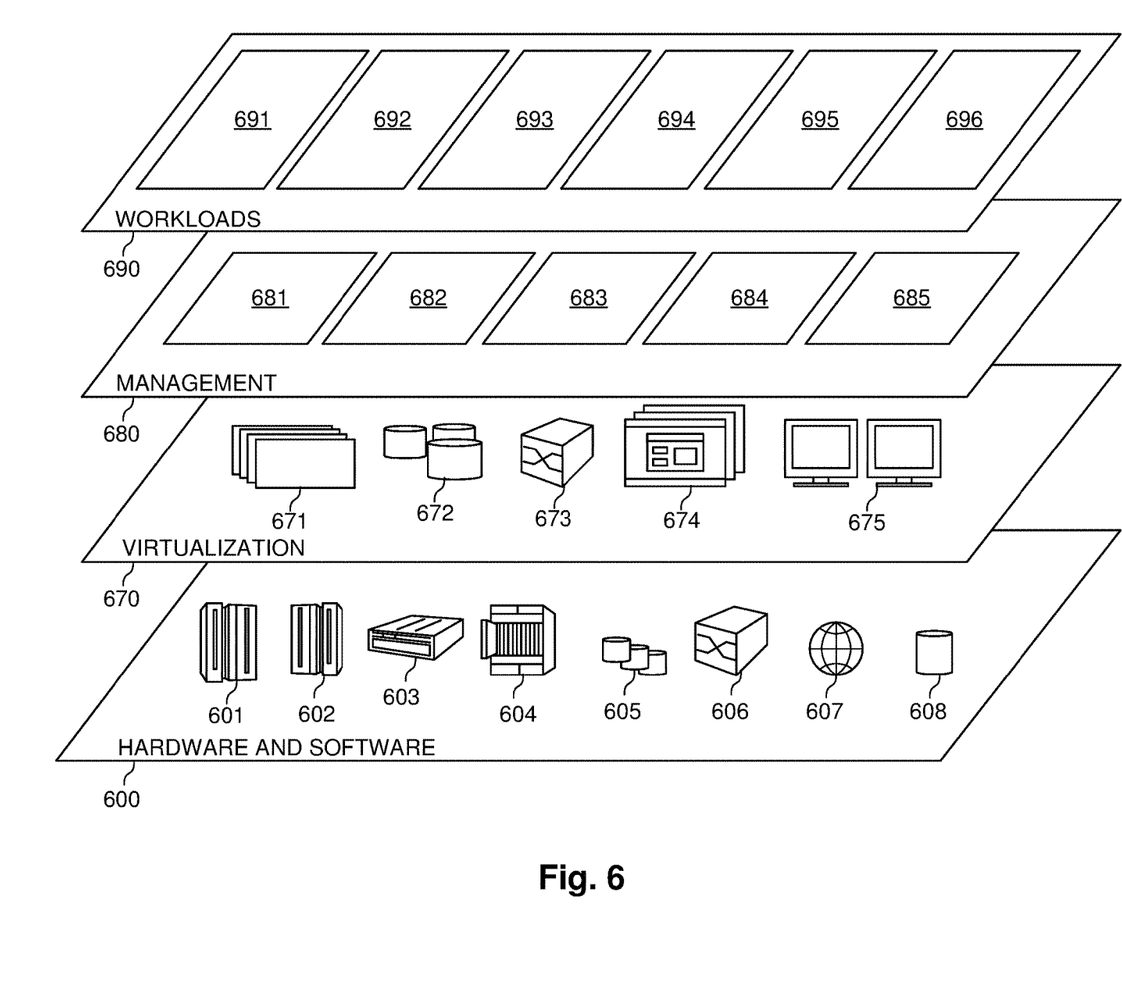
FIG. 6 depicts abstract model layers of a cloud computing environment, according to an exemplary embodiment.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include: mainframes 601; RISC (Reduced Instruction Set Computer) architecture based servers 602; servers 603; blade servers 604; storage devices 605; and networks and networking components 606. In some embodiments, software components include network application server software 607 and database software 608.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and targeted recommendation processing 696 (e.g., recommendation program 112).

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for generating a list of targeted menu item recommendations, the method comprising:

receiving, by one or more computer systems, a menu item recommendation request originating from a user, the menu item recommendation request comprising one or more requirements, the requirements include food type, calorie count, and restaurant location;

performing, by one or more computer systems, text analytics on the menu item recommendation request to generate a search criteria based on the one or more requirements;

retrieving, by one or more computer systems, menu item reviews relating to the search criteria by searching online restaurant menus and social media websites;

simultaneously assigning, by one or more computer systems, an initial value to each menu item review relating to the degree of which the review can be interpreted as a positive recommendation of a menu item irrespective of any input and influence by the user, and normalizing the initial value assigned to each menu item review depending on the context of the review determined using text analytics;

simultaneously assigning, by one or more computer systems, an initial value to each menu item ingredient of menu items corresponding to the retrieved menu item reviews relating to the degree of which the ingredient can be interpreted as a positive recommendation of a menu item, and normalizing the initial value assigned to each menu item ingredient depending on the context of the review determined using text analytics;

simultaneously assigning, by one or more computer systems, a weighted value to each menu item review based on the user's preferences both as defined by the user and as determined using text analytics from a post by the user on a social media website and profile of the user on a social media website;

simultaneously modifying, by one or more computer systems, the weighted value of each menu item review based on an association value, the association value being based on a menu item review by social media website associates of the user and the menu item ingredients of that particular menu item, wherein the retrieved menu item reviews by the social media website associates of the user are given more weight than menu item reviews of non-associates unless the menu item ingredients contradict the user's preferences;

generating, by one or more computer systems, the list of targeted menu item recommendations based on the weighted values assigned to the retrieved menu item reviews, the list of targeted menu item recommendations being organized in order based on the weighted values; and sending the generated list of targeted menu item recommendations to a user's device.

* * * * *